United States Patent [19]
Johanson

[11] Patent Number: 5,622,250
[45] Date of Patent: Apr. 22, 1997

[54] INTERFACE FOR DISCHARGING HOPPER CONTENTS ONTO FEEDER

[75] Inventor: Jerry R. Johanson, San Luis Obispo, Calif.

[73] Assignee: J R Johanson, San Luis Obispo, Calif.

[21] Appl. No.: 543,925

[22] Filed: Oct. 17, 1995

[51] Int. Cl.⁶ ................................................ B65G 47/18
[52] U.S. Cl. ...................... 198/550.01; 198/532; 222/564
[58] Field of Search ...................................... 198/525, 532, 198/534, 550.01, 550.02, 836.1; 222/547, 564

[56] References Cited

U.S. PATENT DOCUMENTS

| | | | |
|---|---|---|---|
| 3,118,575 | 1/1964 | McCauley | 222/564 X |
| 3,399,466 | 9/1968 | Hartley | 198/525 X |
| 4,548,342 | 10/1985 | Fisher | 222/564 X |
| 4,567,920 | 2/1986 | VaaNanen | 222/564 X |
| 4,658,992 | 4/1987 | Peleus | 198/532 X |
| 4,738,774 | 4/1988 | Patrick | 198/534 X |

*Primary Examiner*—James R. Bidwell
*Attorney, Agent, or Firm*—Daniel C. McKown

[57] ABSTRACT

The interface is an apparatus that is attached to the outlet of a hopper to assist and control the discharge of particulate material onto the loading surface of a feeder, such as a moving belt. The interface results in a saving of 50 to 75 percent in the power required to drive the feeder. Three structural innovations contribute to this saving in power. First, a plate that extends vertically and in the direction of movement of the feeder is introduced into the stream of material within the interface to reduce downward pressure on the loading surface of the feeder. Second, the lower edge of the strike-off plate is arched upwardly, which reduces the power required for maintaining the shearing action. Third, the interface is provided with vertical skirts that prevent lateral spreading of the material so that a narrower feeder can be used.

17 Claims, 7 Drawing Sheets

INTERFACE FOR DISCHARGING HOPPER CONTENTS ONTO FEEDER

BACKGROUND OF THE INVENTION

1. Field of the Invention

The present invention is in the field of particulate material handling, and specifically relates an apparatus that is attached to the outlet of a hopper to assist and control the discharge of particulate material onto the loading surface of a feeder, such as a moving belt, so that an uninterrupted controlled flow will be obtained with a considerable reduction in the power required to drive the feeder, compared to the prior art.

2. The Prior Art

In a hypothetical and impractical situation, no interface would be used. The particulate material would stream from the outlet of the hopper, would become airborne, and would land on a moving belt which would transport it to a truck, a railroad car, or a pile. Such a technique would require an oversized feeder which would be only lightly loaded and hence operating at very low efficiency. Also, there would be no control over the discharge rate.

To improve the efficiency and controllability of the system, workers in the art discovered that it was advantageous to provide an interface between the outlet of the hopper and the feeder. Such an interface could serve to control the lateral dispersion of the particulate material and to reduce the effect of cross winds. With reduced lateral dispersion, narrower feeders were used and these were more heavily loaded and hence more efficient.

Normally when an interface is used, the body of particulate material extends without interruption from inside the hopper, downward through the hopper outlet and through the interface to the loading surface of the feeder.

Since the particles within the hopper outlet have no velocity in the direction of travel of the feeder, while the particles bearing against the loading surface of the feeder necessarily have a moderate velocity, it follows that the feeder produces a shearing effect in the body of particulate material. In fact, typically, the power supplied to the feeder is largely used to overcome the shearing resistance, and a smaller component of the power is used to overcome friction and to accelerate the particulate material. The frictional component is related to the downward pressure on the feeder loading surface.

Until the present invention, it was believed that little could be done to reduce the shear component or the frictional component of the power required to operate the feeder. Progress in reducing the required feeder power was at a standstill until, in the mind of the present inventor, there arose some remarkable insights that will now be described.

SUMMARY OF THE INVENTION

The present inventor attacked the problem of how to reduce the power required to operate the feeder in three distinct ways. First, he discovered how to reduce the vertical pressure on the feeder loading surface, thereby reducing the frictional component. Secondly, he discovered how to reduce the power required to shear the stream of particulate material. Thirdly, he discovered how to enable the use of narrower-width feeders. Each of these three improvements is derived from structural innovations in the interface, as will now be described.

The knowledgeable reader is no doubt familiar with the phenomenon of arching that occurs under certain circumstances in hoppers, wherein the material forms a bridge at the outlet preventing further discharge. Clearly the mechanics of particulate flow are strikingly different from those of liquid flow. Keeping in mind this distinction, workers in the field will recall that the downward pressure at the outlet of a hopper is proportional to the width of the outlet. When an interface is used, this pressure is related to the downward pressure on the loading surface of the feeder.

The insight of the present inventor was that the downward pressure on the loading surface of the feeder can be reduced by introducing a plate that extends vertically and in the direction of movement of the feeder in the stream of material directly below the outlet of the hopper, thereby, in effect producing two outlets side by side, each having only half of the total width and hence exerting only half as much downward pressure. This reduces the downward pressure on the loading surface of the feeder and results in reduced friction and a corresponding lower power requirement. In the following Description this plate is referred to as the "vertical center plate."

Next, the present inventor noted that in any hopper undergoing discharge, there must be a preferred imaginary three-dimensional surface on which the shear force imparted by the belt is imposed on the flowing mass of solids. Generally, this imaginary three-dimensional surface has a convex upward curvature that results from the interaction between the motion of the loading surface of the feeder and the friction exerted by the converging side plates and the vertical center plate.

It was an insight of the present inventor that the shearing forces could be greatly reduced if the shearing action could be made to take place along this preferred imaginary three-dimensional surface. It became clear that prior art interfaces required unnecessarily high amounts of power to continually shear the material because in the prior art designs the strike-off plate had a straight horizontal lower edge which did not even come close to approximating the preferred three-dimensional imaginary surface. The present inventor acted upon this insight by changing the shape of the lower edge of the strike-off plate from a straight horizontal lower edge to an upwardly arched lower edge. Because this more closely approximates the shape of the preferred surface, the power required to produce the shearing action is dramatically reduced.

The present inventor further reduced the power required to operate the feeder by reducing the width of the loading surface of the feeder. This he accomplished by providing the interface with vertical skirts on either side, which limited the tendency of the material to spread laterally across the loading surface of the feeder. As a result, narrower feeders that require less power can be used. In the following Description these skirts are referred to as "vertical side plates."

The present inventor combined the above described improvements into a single practical interface in which the power required to operate the feeder is reduced in all three ways described above.

Last, but not least, the present inventor discovered that the discharge rate of the hopper could be controlled advantageously by simply raising or lowering the height of the strike-off plates above the loading surface of the feeder.

As a result of the above improvements, the size of the feeder can be reduced approximately 50 percent and the power required is reduced typically between 50 percent and 75 percent when the interface of the present invention is used.

The novel features which are believed to be characteristic of the new interface, together with further objects and advantages thereof, will be better understood from the following description considered in connection with the accompanying drawings in which two preferred embodiments of the invention are illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
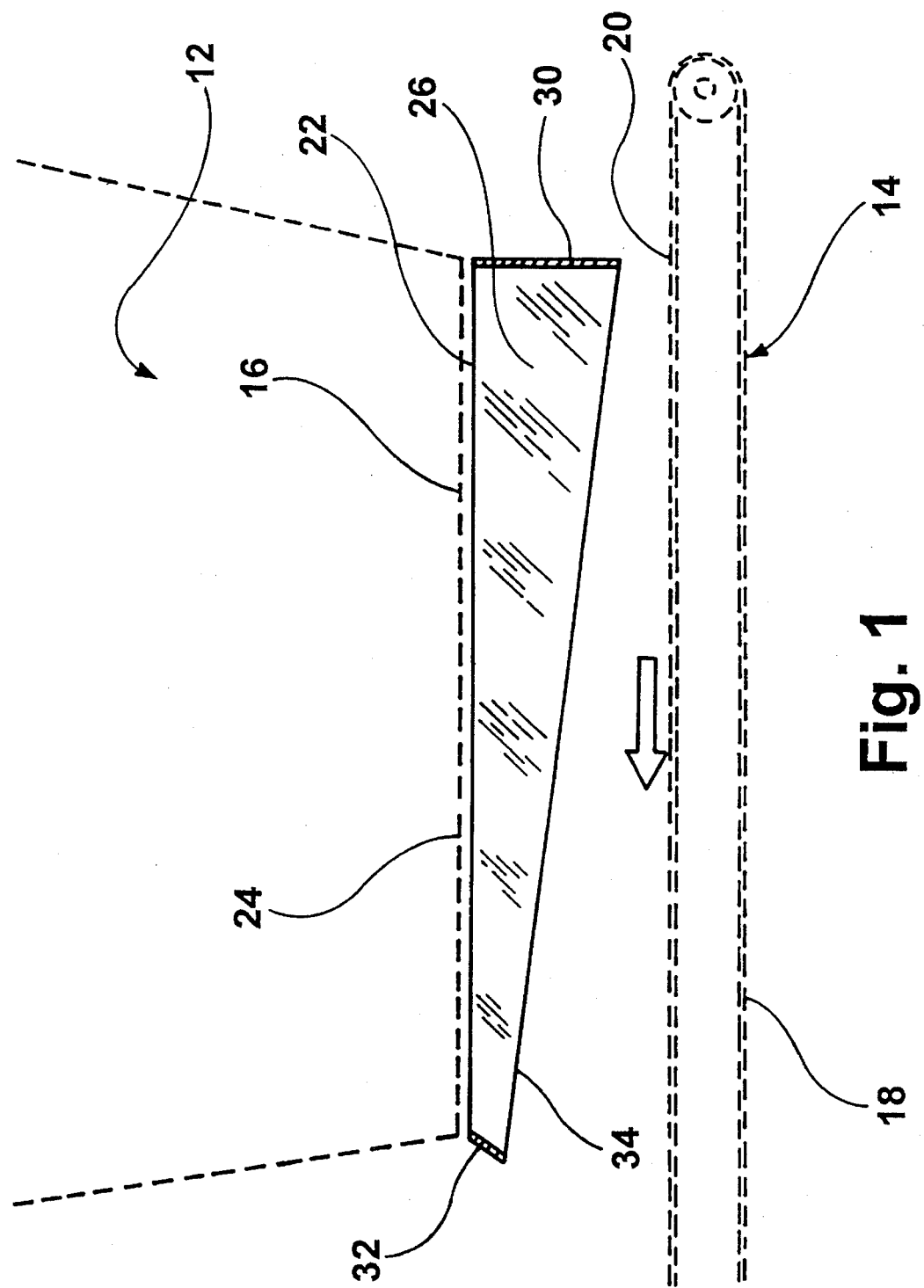
FIG. 1 is a side elevational medial cross-sectional view showing an interface of the prior art and showing the hopper and the feeder in dashed lines.

FIG. 1 is a side elevational medial cross sectional view showing an interface of the prior art interposed between a hopper 12 and a feeder 14. Typically, the hopper 12 has the form of a hollow inverted 4-sided pyramid truncated by a horizontal plane so that the outlet 16 of the hopper is a rectangular slot lying in the truncating plane. Because it is rectangular, the outlet of the hopper 12 includes two spaced parallel longer edges and two spaced parallel shorter edges.

Typically, the feeder includes a belt 18 having a loading surface 20 on which the discharged material lies while it is transported by the belt in the direction indicated by the arrow in FIG. 1. Ordinarily this direction is parallel to the longer edges of the outlet of the hopper.

In the interest of clarity, the upper edge 22 of the interface is shown slightly separated from the lower edge 24 of the hopper in FIG. 1, but in actual use, the upper edge 22 of the interface is attached to the lower edge 24 of the hopper. FIG. 1 is a cross sectional view taken at a vertical plane that passes through the centerline of the belt 18.

Figure 2:
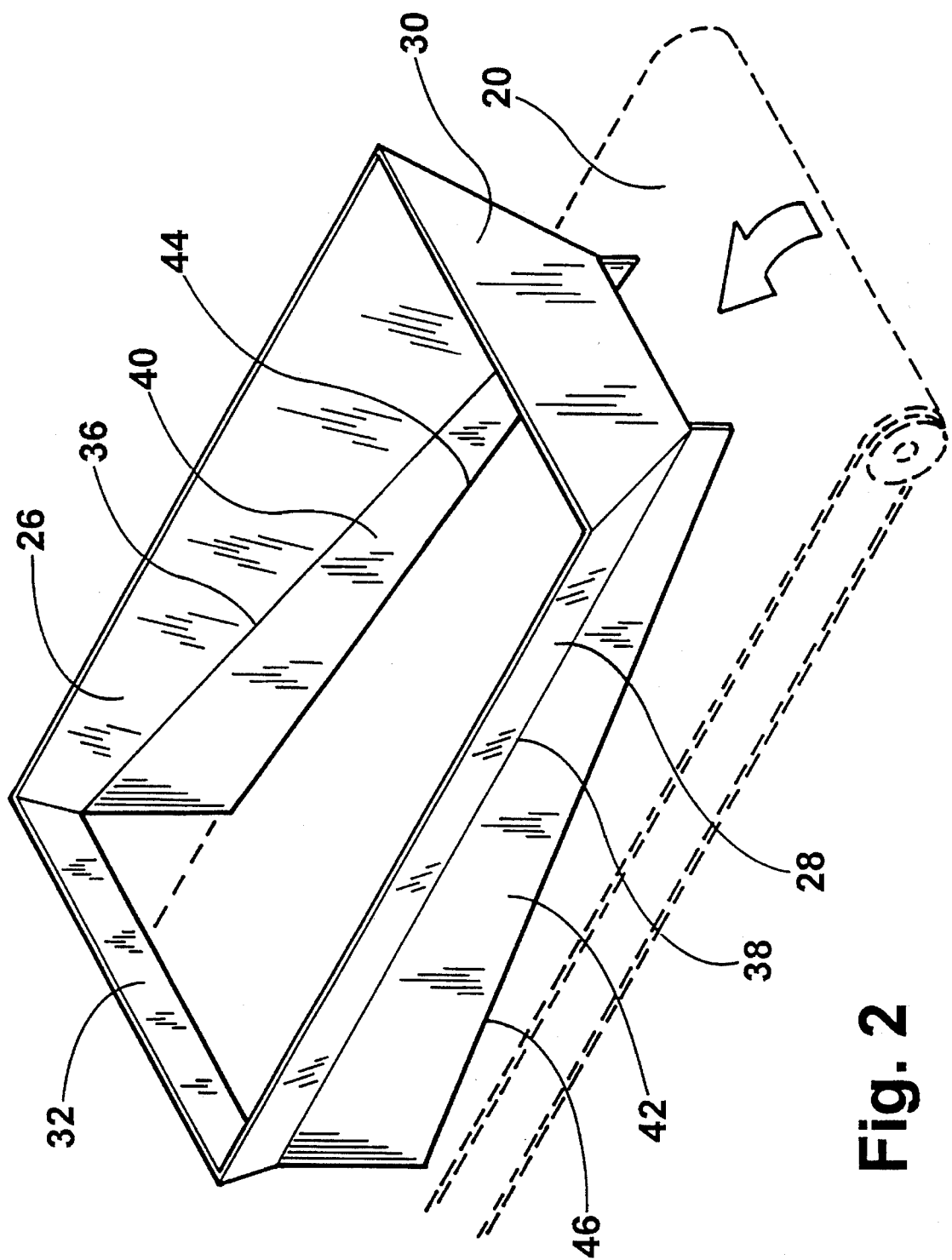
FIG. 2 is an orthographic view showing the arrangement of certain external parts of the interface of the present invention.

The prior art interface of FIG. 1 consists of four plates, which are: two converging side plates 26 (visible in FIG. 1 ) and 28 (best seen in FIG. 2), a laterally-extending vertical plate 30, and a strike-off plate 32. The converging side plates 26 and 28 slope downwardly and inwardly as if they were swung about the lower edge 24 of the hopper. The converging side plates are truncated by an imaginary plane 34 that is inclined in the direction of travel of the loading surface 20, and that is seen edge-on in FIG. 1. The inclined imaginary plane 34 intersects the converging side plates 26 and 28 in two edges 36 and 38 that are the lower edges of the converging side plates. These edges 36 and 38 not only are inclined in the direction of travel of the loading surface 20, but also diverge laterally in the direction of travel of the loading surface, as best seen in FIG. 2. The four plates that make up the prior art interface are also visible in FIG. 2, and they are among the components of the present invention. The geometric relationship of these four plates must be clearly understood if one is to understand the present invention.

In addition to showing the four plates of the prior art interface, FIG. 2 shows the vertical side plates 40 and 42 that are not found in the prior art interfaces and that are unique to the present invention. The vertical side plates 40 and 42 lie in vertical planes that pass through the lower edges 36 and 38 of the converging side plates 26 and 28 respectively. Accordingly, the average lateral distance between the vertical side plates 40 and 42 is equal to the average lateral distance between the lower edges 36 and 38 of the converging side plates 26 and 28, respectively. The vertical side plates 40 and 42 extend downwardly to horizontal lower edges 44 and 46 that are adjacent to but spaced from and parallel to the loading surface 20 of the feeder.

Figure 3:
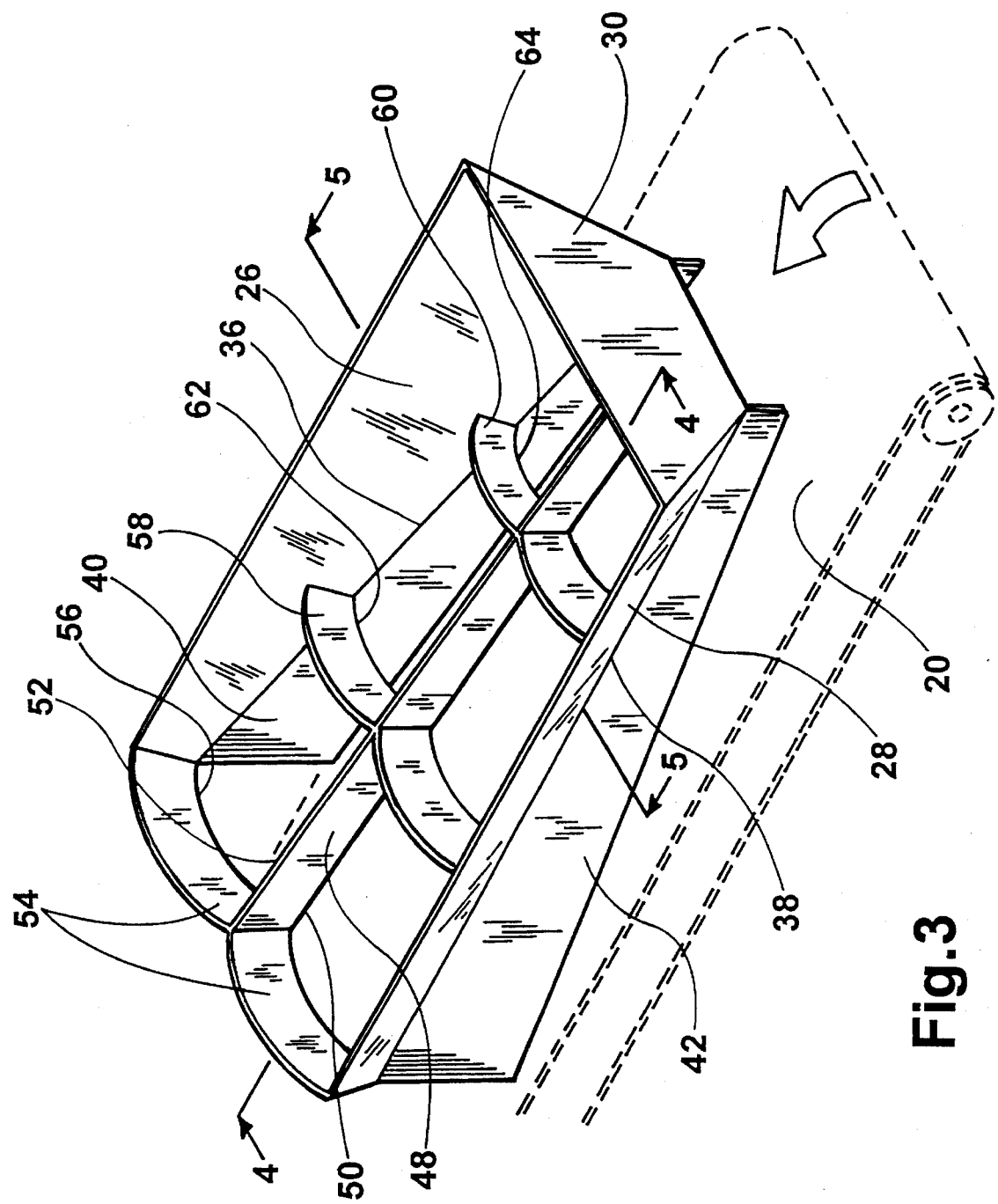
FIG. 3 is an orthographic view showing a first preferred embodiment of the interface of the present invention.
Figure 4:
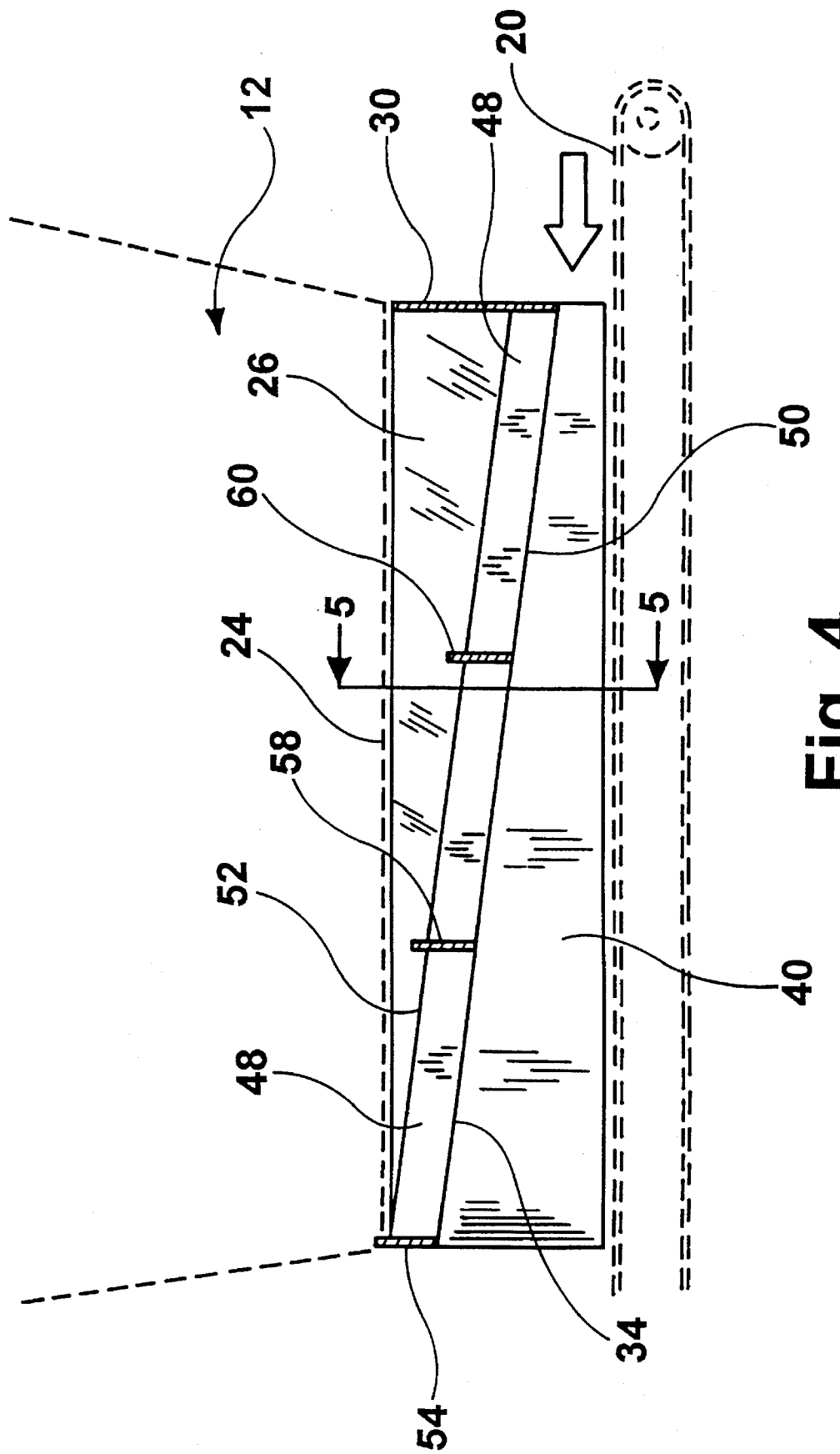
FIG. 4 is a side elevational view in cross section viewed in the direction 4—4 indicated in FIG. 3, showing the first preferred embodiment of FIG. 3.
Figure 5:
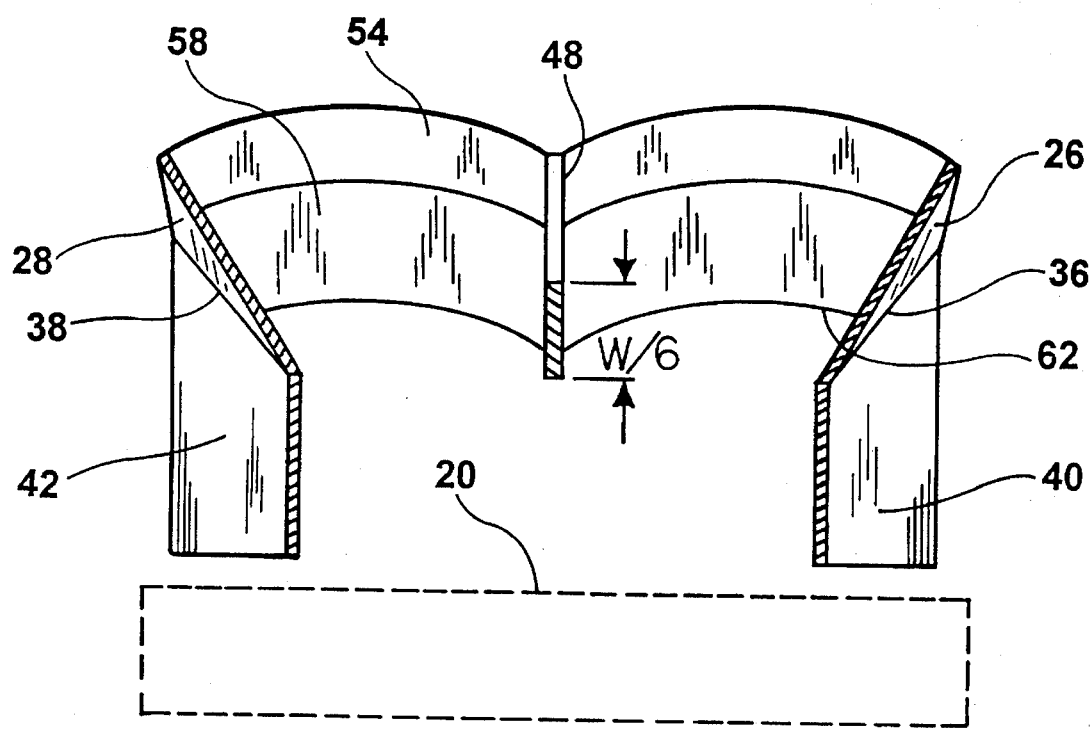
FIG. 5 is an end elevational view in cross section viewed in the direction 5—5 indicated in FIG. 3 of the first preferred embodiment of FIG. 3.

The vertical side plates 40 and 42 are unique to the present invention, but the present invention also includes other structures, shown in FIGS. 3, 4 and 5. In particular, the present invention includes the vertical center plate 48 which is inclined upwardly in the direction of travel of the loading surface of the belt and which is located mid-way between the converging side plates 26 and 28. The vertical center plate 48 has a lower edge 50 that lies in the imaginary plane 34 and has an upper edge 52 that is parallel to the lower edge. In a preferred embodiment of the present invention, the height of a vertical cross section through the vertical center plate 48 is approximately equal to W/6, where W is the average lateral distance between the vertical side plates 40 and 42.

It is generally known in the art that the downward pressure at the outlet of a converging hopper is proportional to the width of the outlet. The vertical center plate 48 divides the width of the outlet in half, and thereby also reduces the downward pressure to half of what it would be if the vertical center plate 48 were not present.

It is a reasonable concern that the downward pressure might be reduced too much, in which case flow might not occur. Fortunately, it can be shown mathematically that flow will always occur so long as the height of a vertical cross section through the vertical center plate 48 does not exceed W/6, as best seen in FIG. 5, where W is the average lateral distance between the vertical side plates 40 and 42. Lowering the outlet pressure reduces the force required to shear the particulate material from the hopper, thereby reducing drag on the loading surface 20, and also reduces the downward force on the loading surface 20. Both of these reductions act to reduce the power required to drive the feeder.

The vertical side plates 40 and 42 serve to prevent the particulate material from spilling laterally over the side of the belt, thereby reducing the required belt width. This also reduces the power required to operate the feeder.

As best seen in FIG. 3, the strike-off plate 54 of the present invention is connected to the vertical center plate 48. In the first preferred embodiment shown in FIGS. 3, 4 and 5, the strike-off plate 54 extends laterally on both sides from the vertical center plate to lateral edges that are attached to the converging side plates 26 and 28.

Unlike the strike-off plate 32 of the prior art, shown in FIG. 1, in accordance with the present invention, the lower edge 56 of the strike-off plate 54 is arched upwardly between each lateral edge and the vertical center plate 48. The arched shape of the lower edge 56 more closely conforms to the preferred imaginary three-dimensional surface on which the shear force imparted by the belt is imposed on the flowing mass of a particulate material thereby facilitating the shearing action. Also, the arched lower edge 56 of the strike-off plate 54 relieves the tendency of the material to build up in front of the strike-off plate, where the build-up would oppose the shearing action. Thus, the upwardly arched lower edge 56 further reduces the power required to operate the feeder.

In the first preferred embodiment shown in FIG. 3, the lower edge of the strike-off plate is arched upwardly an amount approximately equal to W/8, where W is the average lateral distance between the vertical side plates 40 and 42.

In the first preferred embodiment of FIG. 3, the vertical center plate 48 is connected to the converging side plates 26 and 28 by one or more lateral support plates, of which the lateral support plates 58 and 60 are typical. The lower edges 62 and 64 respectively of the lateral support plates 58 and 60 are arched upward an amount approximately equal to W/8, where W is the average lateral distance between the vertical side plates 40 and 42.

Figure 8:
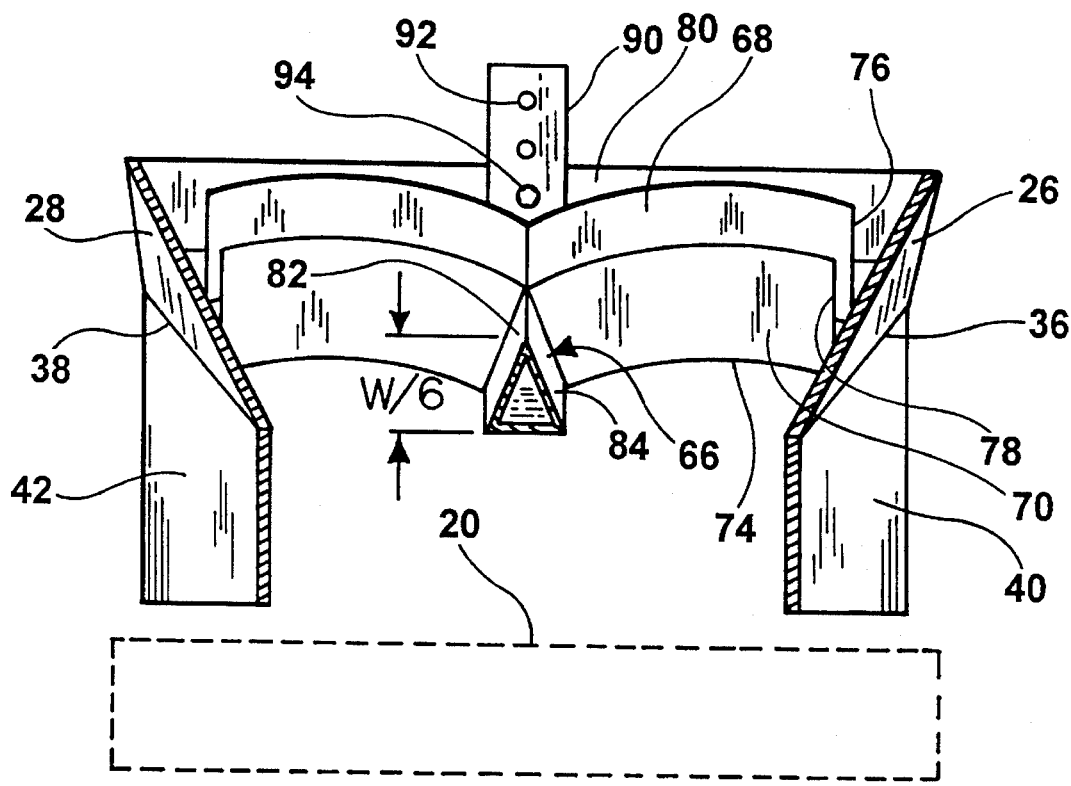
Figure 6:
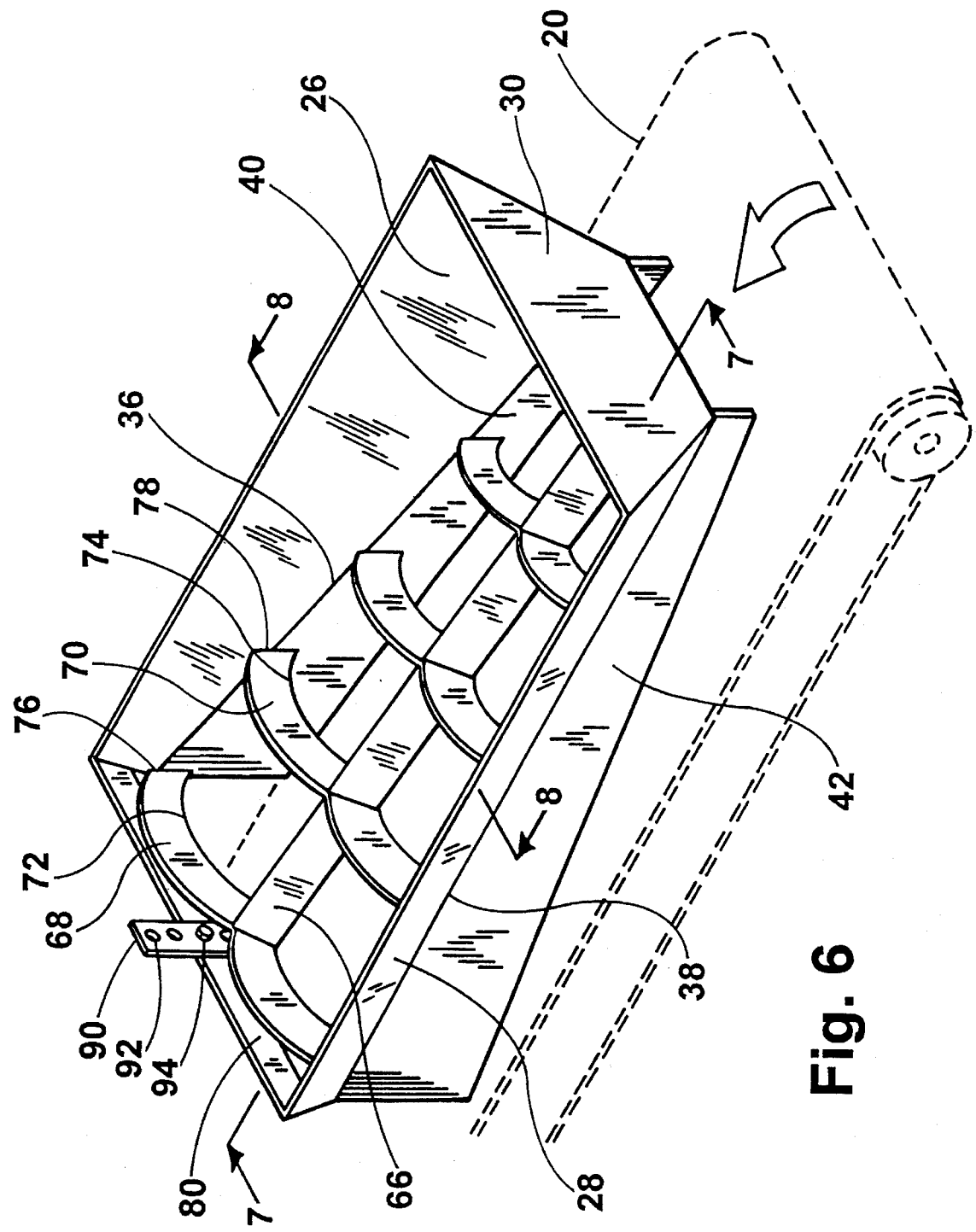
FIG. 6 is an orthographic view showing a second preferred embodiment of the interface of the present invention.
Figure 7:
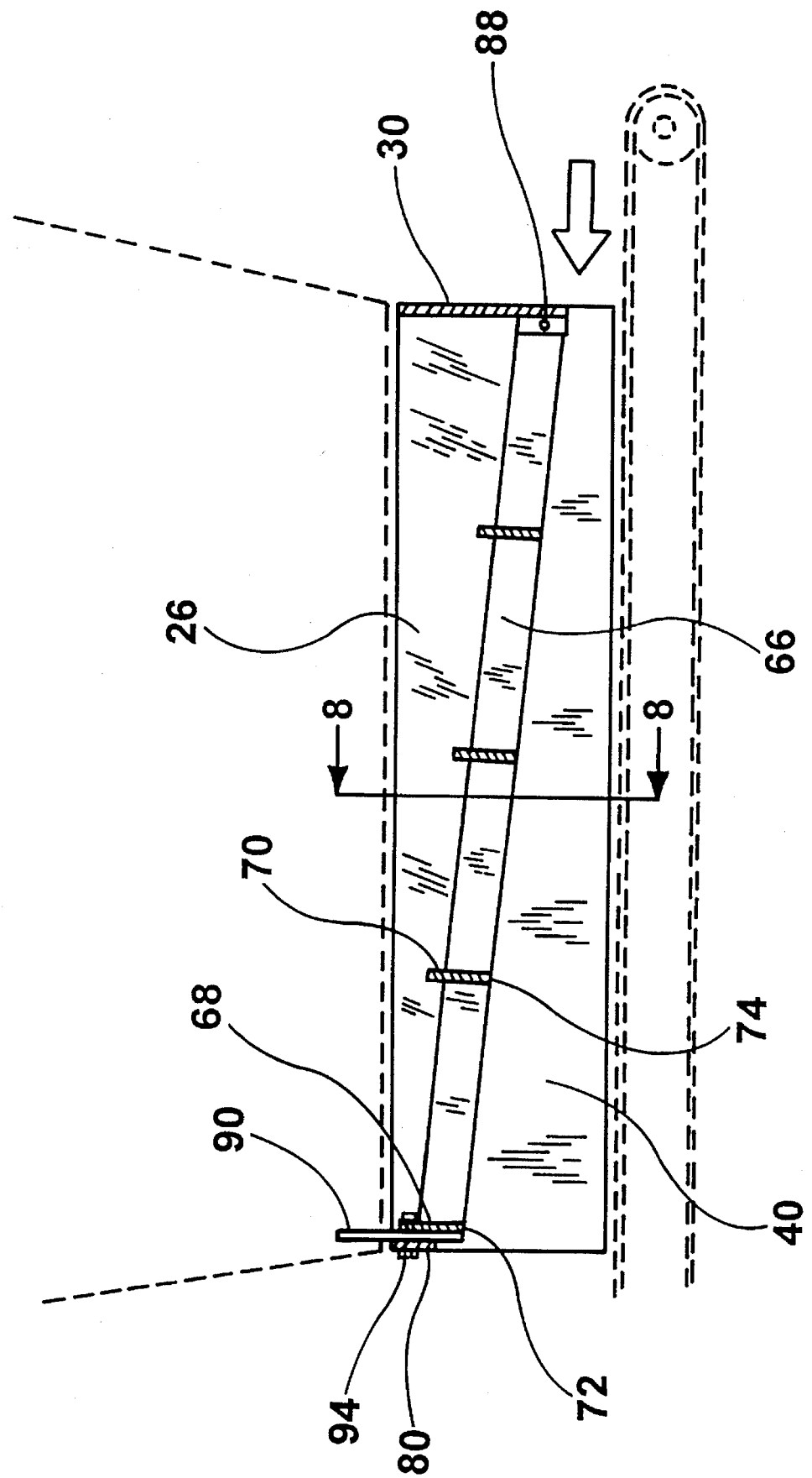
FIG. 7 is a side elevational view in cross section viewed in the direction 7—7 indicated in FIG. 6, showing the second preferred embodiment of FIG. 6; and, FIG. 8 is an end elevational view in cross section viewed in the direction 8—8 indicated in FIG. 6 showing the second preferred embodiment of FIG. 6.

FIGS. 6, 7 and 8 show a second preferred embodiment of the present invention. The second preferred embodiment differs from the first preferred embodiment of FIGS. 3, 4 and 5 in that a center converging member 66 is used in place of the vertical center plate 48; the strike-off plate 68 and the lateral plates (of which the lateral plate 70 is typical) are attached to the center converging member 66, but the strike-off plate 68 and the lateral plate 70 extend to lateral edges 76 and 78 respectively that are adjacent to, but spaced from the vertical side plates 40 and 42. Further, in the second preferred embodiment of FIGS. 6, 7 and 8, the center converging member 66 is pivotally connected by the pin 88 of FIG. 7 to the laterally-extending vertical plate 30 to permit limited pivotal motion of the center converging member 66 in a vertical plane. A metal strap 90 is attached to and extends upward from the end of the center converging member 66 nearest the strike-off plate 68. The strap 90 includes a number of vertically-spaced holes, of which the hole 92 is typical. The plate 80 includes a laterally-centered hole. A bolt 94 passed through the hole in the plate 80 and through one of the holes in the strap 90 secures the center converging member 66 at a selected inclination with respect to the belt loading surface 20. The purpose of being able to pivot the center converging member 66 in a vertical plane is to permit alteration of the rate at which the particulate material is removed from the hopper.

As in the first preferred embodiment, the lower edge 72 of the strike-off plate 68 is arched upwardly between the lateral edge 76 and the center converging member 66. In the preferred embodiment, the amount of this arching is approximately equal to W/8, where W is the average lateral distance between the vertical side plates 40 and 42.

Likewise, the lower edge 74 of the lateral plate 70 is arched upwardly between the lateral edge 78 and the center converging member 66. In the preferred embodiment, the amount of arching is approximately equal to W/8 where W is the average lateral distance between the vertical side plates 40 and 42.

As best seen in FIG. 8, the height of a vertical cross section through the center converging member 66 is approximately equal to W/6, where W is the average lateral distance between the vertical side plates 40 and 42.

When the angle of inclination of the center converging member 66 is adjusted to smaller angles, the center converging member 66 lies between the vertical side plates 40 and 42. If the center converging member 66 were a simple vertical plate as in the first preferred embodiment, there would be no downward convergence between the center member and the vertical side members, and this would not reduce the pressure on the particulate material at the shear interface, since the material would be confined between non-converging surfaces. Therefore, in order to provide a downwardly-converging-surface situation for the particulate material, in the second preferred embodiment, the sides 82 and 84 of the center converging member 66 must converge downwardly toward the vertical side plates 40 and 42 respectively.

The adjustability of the second preferred embodiment allows a very large feed depth adjustment with only minor negative effects. This feed depth adjustment permits the feed rate to be varied without having to use a variable speed drive on the feeder.

When the teachings of the present invention have been applied to practical situations, it has been found that feeders of smaller size can be used. Generally, the feeder can be reduced 25 percent to 50 percent in width. Also, it has been found that the teachings of the present invention permit the power required to operate the feeder to be in the range of 25 percent to 50 percent of the power required in prior art designs. In addition to this noteworthy reduction in the power requirement, the interface of the present invention results in less feeder pressure and consequently less wear, lower feeder loads, less support structure, lower starting torque, and longer feeder life.

It has also been found in practice that the design of the present invention can be used, not only for belt-type feeders, but can also be used with apron feeders, screw feeders, and drag chain feeders.

Thus, there have been described two embodiments of an interface used in controlling the flow of particulate materials from a hopper to a feeder. Both embodiments result in a significant reduction of the power required to drive the feeder, and permit the use of smaller sized feeders.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. In an interface between a feeder and a hopper, said hopper having a rectangular slot outlet that includes two spaced parallel longer edges and two spaced parallel shorter edges that lie in a horizontal plane, said interface having a pair of converging side plates converging downwardly respectively from the two spaced parallel longer edges of the rectangular slot and extending downwardly to an inclined lower edge the elevation of which above the loading surface of the feeder increases in the direction of travel of the loading surface, the inclined lower edges of the converging side plates defining an inclined plane sloping upwardly in the direction of travel of the loading surface of the feeder, said pair of converging side plates connected above the intake end of the feeder by a laterally-extending vertical plate that extends vertically downward from one of the two spaced parallel shorter edges, said pair of converging side plates connected above the discharge end of the feeder by a laterally-extending strike-off plate, the improvement comprising:

a vertical center plate inclined upwardly in the direction of travel of the loading surface of the feeder, located midway between the converging side plates, having a lower edge lying in said inclined plane and having an upper edge parallel to the lower edge.

2. The improvement of claim 1 further comprising:

a pair or vertical side plates respectively connected to and extending vertically downward from the inclined lower edges of the converging side plates and extending downward to a lower edge that is adjacent to but spaced from and parallel to the loading surface of the feeder.

3. The improvement of claim 1 where said strike-off plate extends vertically and laterally from said vertical center plate to lateral edges attached to the converging side plates, said strike-off plate including a lower edge that is arched upwardly between each lateral edge and said vertical center plate.

4. The improvement of claim 3 wherein the lower edge of said strike-off plate is arched upwardly between each lateral edge and said vertical center plate an amount approximately equal to W/8, where W is the average lateral distance between the inclined lower edges of the converging side plates.

5. The improvement of claim 1 further comprising:

a lateral support plate extending laterally and vertically and connecting said vertical center plate to the converging side plates.

6. The improvement of claim 5 wherein said lateral support plate further comprises a lower edge that is arched upwardly between each converging side plate and said vertical center plate.

7. The improvement of claim 6 wherein said lower edge is arched upwardly between each converging side plate and said vertical center plate an amount approximately equal to W/8, where W is the average lateral distance between the inclined lower edges of the converging side plates.

8. The improvement of claim 1 wherein the height of a vertical cross section through said vertical center plate is approximately equal to W/6, where W is the average lateral distance between said vertical side plates.

9. In an interface between a feeder and a hopper, said hopper having a rectangular slot outlet that includes two spaced parallel longer edges and two spaced parallel shorter edges that lie in a horizontal plane, said interface having a pair of converging side plates converging downwardly respectively from the two spaced parallel longer edges of the rectangular slot and extending downwardly to an inclined lower edge the elevation of which above the loading surface of the feeder increases in the direction of travel of the loading surface, the inclined lower edges of the converging side plates defining an inclined plane sloping upwardly in the direction of travel of the loading surface of the feeder, said pair of converging side plates connected above the intake end of the feeder by a laterally-extending vertical plate that extends vertically downward from one of the two spaced parallel shorter edges, the improvement comprising:

a pair of vertical side plates respectively connected to and extending vertically downward from the inclined lower edges of the converging side plates and extending downward to a lower edge that is adjacent to but spaced from and parallel to the loading surface of the feeder; and, a center converging member inclined upwardly in the direction of travel of the feeder, located midway between the vertical side plates, and having sides that slope downwardly and outwardly toward said vertical side plates.

10. The improvement of claim 9 further comprising means for pivotally connecting said center converging member to the laterally-extending vertical plate to permit pivotal motion of said center converging member in a vertical plane.

11. The improvement of claim 9 further comprising:

a strike-off plate extending laterally from said center converging member to lateral edges adjacent but spaced respectively from said pair of vertical side plates.

12. The improvement of claim 11 wherein said strike-off plate further includes a lower edge that is arched upwardly between each lateral edge and said center converging member.

13. The improvement of claim 12 wherein the lower edge of said strike-off plate is arched upwardly between each lateral edge and said center converging member an amount approximately equal to W/8, where W is the average lateral distance between said pair of vertical side plates.

14. The improvement of claim 9 further comprising:

a lateral plate extending laterally and approximately vertically from said center converging member to lateral edges adjacent but spaced respectively from said pair of vertical side plates.

15. The improvement of claim 14 wherein said lateral plate further includes a lower edge that is arched upwardly between each lateral edge and said center converging member.

16. The improvement of claim 15 wherein said lower edge is arched upwardly between each lateral edge and said center converging member an amount approximately equal to W/8, where W is the average lateral distance between said pair of vertical side plates.

17. The improvement of claim 9 wherein the height of a vertical cross section through said center converging member is approximately equal to W/6, where W is the average lateral distance between said pair of vertical side plates.

\* \* \* \* \*